(12) United States Patent
Bharadwaj et al.

(10) Patent No.: US 9,137,812 B2
(45) Date of Patent: Sep. 15, 2015

(54) APPARATUS AND METHODS FOR IMPROVING PERFORMANCE IN MULTI-FLOW COMMUNICATION

(71) Applicant: QUALCOMM Incorporated, San Diego, CA (US)

(72) Inventors: Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/912,413

(22) Filed: Jun. 7, 2013

(65) Prior Publication Data

US 2014/0036799 A1 Feb. 6, 2014

Related U.S. Application Data

(60) Provisional application No. 61/679,592, filed on Aug. 3, 2012.

(51) Int. Cl.

| | |
|---|---|
| *H04W 4/00* | (2009.01) |
| *H04W 72/08* | (2009.01) |
| *H04L 1/00* | (2006.01) |
| *H04L 1/18* | (2006.01) |
| *H04L 5/00* | (2006.01) |

(52) U.S. Cl.
CPC ........... *H04W 72/085* (2013.01); *H04L 1/0026* (2013.01); *H04L 1/0027* (2013.01); *H04L 1/0028* (2013.01); *H04L 1/1858* (2013.01); *H04L 5/001* (2013.01); *H04L 5/0035* (2013.01)

(58) Field of Classification Search
CPC .. H04W 72/08; H04W 72/085; H04L 1/0026; H04L 1/0027; H04L 1/0028; H04L 1/1858; H04L 1/1861; H04L 1/1864; H04L 5/001; H04L 5/0035

See application file for complete search history.

(56) References Cited

U.S. PATENT DOCUMENTS 7,499,474 B2 * 3/2009 Derryberry et al. .......... 370/538
8,165,081 B2 * 4/2012 Papasakellariou et al. ... 370/329
(Continued)

FOREIGN PATENT DOCUMENTS

| WO | 2011100627 A1 | 8/2011 |
|---|---|---|
| WO | 2011100646 A1 | 8/2011 |

OTHER PUBLICATIONS

International Search Report and Written Opinion—PCT/US2013/053507—ISA/EPO—Nov. 8, 2013.
(Continued)

*Primary Examiner* — Kevin Mew
(74) *Attorney, Agent, or Firm* — Darren M. Simon (57) ABSTRACT

A method that includes determining a multi-flow configuration for a multi-flow communication of a user equipment (UE), wherein the multi-flow configuration identifies whether a multi-frequency configuration is utilized and whether multiple-input multiple-output (MIMO) communication is configured for at least one cell in the multi-flow communication, determining one or more cell groups based on the multi-flow configuration, and determining at least one of a channel quality indicator (CQI) repetition rule or a hybrid automatic repeat request acknowledgment (HARQ-ACK) repetition rule for the multi-flow communication based on one or more of the multi-flow configuration or the one or more cell groups.

22 Claims, 7 Drawing Sheets

(56) References Cited

U.S. PATENT DOCUMENTS

| | | | |
|---|---|---|---|
| 8,254,244 B2* | 8/2012 | Montojo et al. | 370/207 |
| 8,498,639 B2* | 7/2013 | Chen et al. | 455/434 |
| 8,514,820 B2* | 8/2013 | Cai et al. | 370/336 |
| 2008/0056227 A1* | 3/2008 | Love et al. | 370/343 |
| 2008/0214198 A1* | 9/2008 | Chen et al. | 455/450 |
| 2009/0201825 A1* | 8/2009 | Shen et al. | 370/252 |
| 2009/0274204 A1* | 11/2009 | Chen et al. | 375/228 |
| 2010/0172428 A1* | 7/2010 | Pani et al. | 375/262 |
| 2011/0200015 A1* | 8/2011 | Bharadwaj et al. | 370/335 |
| 2012/0051245 A1* | 3/2012 | Nam et al. | 370/252 |
| 2012/0082157 A1* | 4/2012 | Yamada et al. | 370/389 |
| 2012/0122472 A1 | 5/2012 | Krishnamurthy et al. | |
| 2012/0176947 A1* | 7/2012 | Xi et al. | 370/311 |
| 2012/0207110 A1 | 8/2012 | Miao et al. | |
| 2012/0257568 A1 | 10/2012 | Cai et al. | |
| 2013/0021980 A1 | 1/2013 | Yang et al. | |
| 2013/0064180 A1 | 3/2013 | Bergman et al. | |
| 2013/0315185 A1* | 11/2013 | Kim et al. | 370/329 |
| 2014/0177586 A1* | 6/2014 | Jang et al. | 370/329 |
| 2014/0226608 A1* | 8/2014 | Seo et al. | 370/329 |
| 2015/0043462 A1* | 2/2015 | Hwang et al. | 370/329 |

OTHER PUBLICATIONS

Qualcomm Incorporated: "HARQ-ACK and CQI repetition in Multiflow HSPA," 3GPP Draft; R1-123800 HARQ-ACK and CQI Repetition in Multiflow HSPA, 3rd Generation Partnership Project (3GPP), Mobile Competence Centre ; 650, Route Des Lucioles ; F-06921 Sophia-Antipolis Cedex ; FR vol. RAN WG1, no. Qingdao, China; 20120813-20120817, Aug. 5, 2012, XP050661653.

Qualcomm Incorporated: "HS-SCCH orders in Multiflow HSDPA and associated HS-DPCCH formats", 3GPP Draft; R1-122853 HS-SCCH Orders in Multiflow HSDPA and Associated HS-DPCCH Formats, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; 20120521-20120525, May 12, 2012, XP050601022, pp. 7.

ZTE: "HS-DPCCH formats for MF-HSDPA", 3GPP Draft; R1-122618 MF-HSDPA HS-DPCCH Formats, 3rd Generation Partnership Project (3GPP), Mobile Competence Centre 650, Route Des Lucioles ; F-06921 Sophia-Antipolis Cedex ; France, vol. RAN WG1, no. Prague, Czech Republic; 20120521-20120525, May 12, 2012, XP050600804, [retrieved on May 12, 2012].

* cited by examiner

APPARATUS AND METHODS FOR IMPROVING PERFORMANCE IN MULTI-FLOW COMMUNICATION

CLAIM OF PRIORITY UNDER 35 U.S.C. §119

The present application for patent claims priority to U.S. Provisional Application No. 61/679,592 entitled "HARQ-ACK AND CQI REPETITION IN MULTI-FLOW HSPA" filed Aug. 3, 2012, and assigned to the assignee hereof and hereby expressly incorporated by reference herein.

BACKGROUND

1. Field

Aspects of the present disclosure relate generally to wireless communication systems, and more particularly to techniques for improving performance in a multi-flow wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. In one example, in order to improve control channel performance, a user equipment (UE) may transmit feedback indicative of the quality of a downlink channel and/or the status of a received communication. Such feedback may be used for, e.g., handling of radio resources, scheduling, selection of transport formats, or setting of targets for power control.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided that includes determining a multi-flow configuration for a multi-flow communication of a UE, wherein the multi-flow configuration identifies whether a multi-frequency configuration is utilized and whether multiple-input multiple-output (MIMO) communication is configured for at least one cell in the multi-flow communication. The method further includes determining one or more cell groups based on the multi-flow configuration, and determining at least one of a channel quality indicator (CQI) repetition rule or a hybrid automatic repeat request acknowledgment (HARQ-ACK) repetition rule for the multi-flow communication based on one or more of the multi-flow configuration or the one or more cell groups.

These and other aspects will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide improved performance in multi-flow communication by allowing for CQI repetition and/or HARQ-ACK repetition to be configured when feasible. In one aspect, the feasibility of CQI and/or HARQ-ACK repetition is determined based on the multi-flow configuration of the multi-flow communication.

Figure 1:
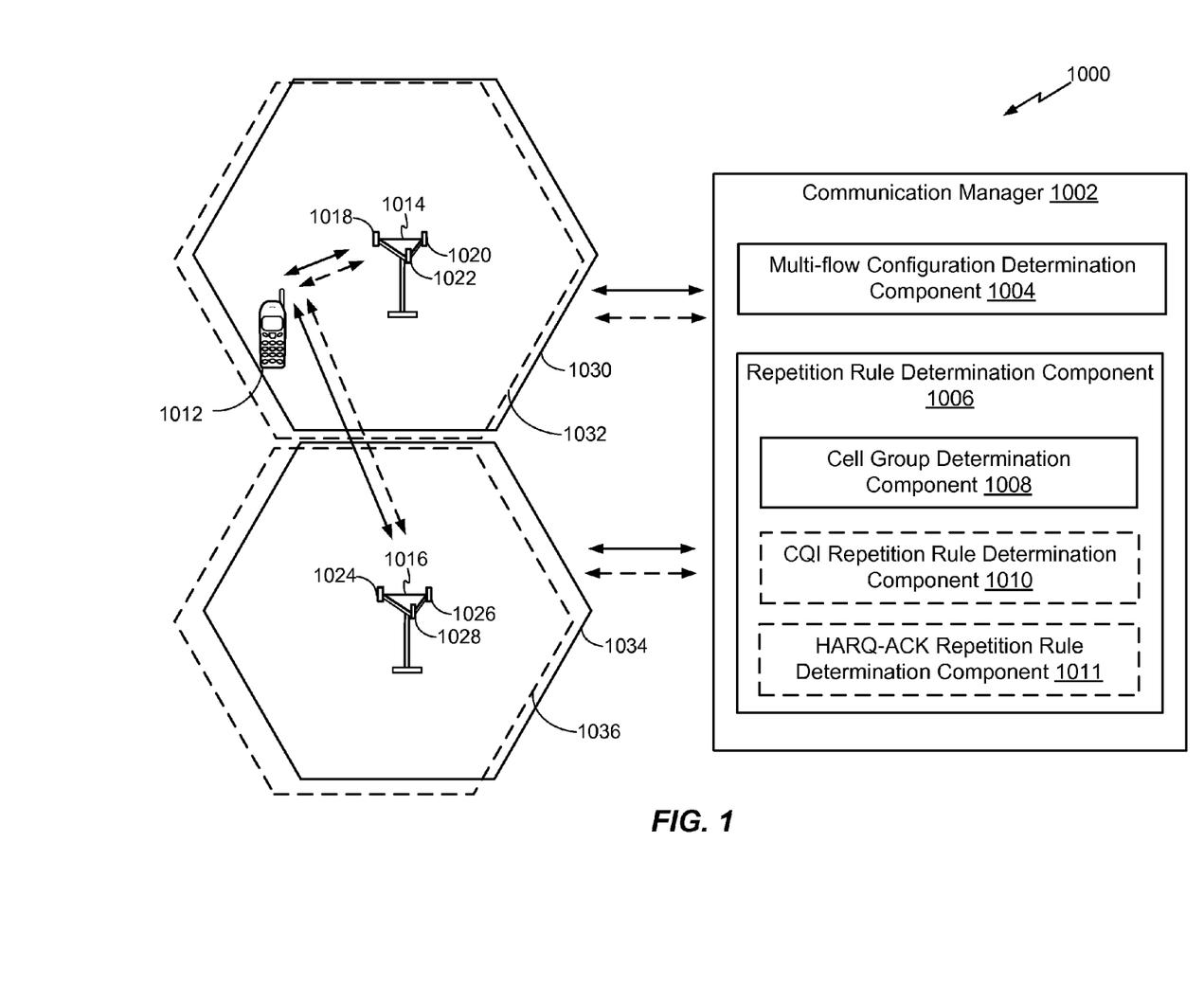
FIG. 1 is a schematic block diagram of one aspect of a system for improving performance in multi-flow communication.

Referring to FIG. 1, in one aspect, a multi-flow wireless communication system 1000 includes UE 1012 which is in multi-flow communication in one or more cells 1030, 1032, 1034, and 1036, to receive wireless network access. As shown in FIG. 1, in one aspect, Node B 1014 represents cells 1030 and 1032, and Node B 1016 represents cells 1034 and 1036. In one example, Node B 1014 and Node B 1016 may include antenna groups 1018, 1020, and 1022, and antenna groups 1024, 1026, and 1028, respectively. Each antenna group may correspond to a different sector of the relevant cell.

Each of Node B 1014 and 1016 can be substantially any Node B, such as a macrocell, picocell, or femtocell Node B, a mobile Node B, a relay, a UE that communicates in a peer-to-peer or ad-hoc mode with UE 1012, and/or substantially any component that schedules UEs for communicating in a wireless network.

Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

System 1000 also includes communication manager 1002 for communicating with Node B 1014 and Node B 1016 to facilitate access to the wireless network. Communication manager 1002 includes a multi-flow configuration determination component 1004 for determining a multi-flow configuration for the multi-flow communication of UE 1012 in one or more cells 1030, 1032, 1034, and 1036. In one aspect, cells 1030 and 1032 may be collocated and supported by the same Node B 1014, but use different carrier frequencies. Similarly, in one aspect, cells 1034 and 1036 may be collocated and supported by the same Node B 1016, but use different carrier frequencies. In one aspect, cells 1030 and 1034 share a first carrier frequency, while cells 1032 and 1036 share a second carrier frequency different than the first carrier frequency.

In one aspect, UE 1012 may be in a single-frequency dual-cell (SF-DC) multi-flow communication in, for example, cell 1030 of Node B 1014 and cell 1034 of Node B 1016. In this aspect, the two cells of the multi-flow communication of UE 1012, cells 1030 and 1034, share a first carrier frequency and are not collocated. In some aspects, the SF-DC multi-flow communication of UE 1012 may be a MIMO SF-DC multi-flow communication when MIMO is configured for at least one cell of the multi-flow communication. In some aspects, the SF-DC multi-flow communication of UE 1012 is a non-MIMO SF-DC multi-flow communication when MIMO is not configured for any cells of the multi-flow communication.

In one aspect, UE 1012 may be in a dual-frequency three-cell (DF-3C) multi-flow communication in, for example, cells 1030 and 1032 of Node B 1014 and cell 1034 of Node B 1016. In this aspect, collocated cells 1030 and 1032 use a first carrier frequency and a second carrier frequency, respectively, while cell 1034 is not collocated with collocated cells 1030 and 1032 and is sharing the first carrier frequency with cell 1030. In some aspects, the DF-3C multi-flow communication of UE 1012 may be a MIMO DF-3C multi-flow communication when MIMO is configured for at least one cell of the multi-flow communication. In some aspects, the DF-3C multi-flow communication of UE 1012 is a non-MIMO DF-3C multi-flow communication when MIMO is not configured for any cells of the multi-flow communication.

In one aspect, UE 1012 may be in a dual-frequency four-cell (DF-4C) multi-flow communication in, for example, cells 1030 and 1032 of Node B 1014 and cells 1034 and 1036 of Node B 1016. In this aspect, collocated cells 1030 and 1032 use a first carrier frequency and a second carrier frequency, respectively. Also, in this aspect, collocated cells 1034 and 1036 (that are not collocated with collocated cells 1030 and 1032) share the first carrier frequency with cell 1030 and share the second carrier frequency with cell 1032, respectively. In some aspects, the DF-4C multi-flow communication of UE 1012 may be a MIMO DF-4C multi-flow communication when MIMO is configured for at least one cell of the multi-flow communication. In some aspects, the DF-4C multi-flow communication of UE 1012 is a non-MIMO DF-4C multi-flow communication when MIMO is not configured for any cells of the multi-flow communication.

Communication manager 1002 may include repetition rule determination component 1006 for determining one or more repetition rules corresponding to the multi-flow communication of UE 1012. The repetition rules may correspond to the feasibility of configuring the same repetition factor for CQI and/or HARQ-ACK repetition in different cells of the multi-flow communication of UE 1012. Repetition rule determination component 1006 may include a cell group determination component 1008 for grouping one or more cells in the multi-flow configuration of UE 1012 into one or more cell groups. Repetition rule determination component 1006 may include a CQI repetition rule determination component 1010 for determining a CQI repetition rule of the multi-flow communication of the UE 1012 based on one or more of the multi-flow configuration of the UE 1012 or the cell groups. Repetition rule determination component 1006 may additionally or alternatively include a HARQ-ACK repetition rule determination component 1011 for determining a HARQ-ACK repetition rule of the multi-flow communication of the UE 1012 based on one or more of the multi-flow configuration of the UE 1012 or the cell groups.

In one aspect of the present disclosure, HARQ-ACK and CQI repetition is allowed to be configured without changes to the radio resource control (RRC) signaling related to UE 1012. Repetition of HARQ-ACK and CQI reports was introduced in Rel-6 to improve the control channel performance and also to reduce the impact on the UE headroom. Separate configurable repetition parameters were introduced for HARQ-ACK repetition (N_acknack_transmit) and CQI repetition (N_cqi_transmit). In some aspects, when multiple cells are configured in HSDPA, the repetition parameters for both HARQ-ACK and CQI reporting were the same for all the configured carriers. Since all the cells were part of the same sector in the same Node B, the link budget for all the cells was the same. Therefore, there was no advantage to the introduction of independent repetition factors for each cell.

In the case of multi-flow, in one aspect, the configured cells may reside in different Node Bs in the case of Inter-Node B multi-flow, or in different remote radio heads (RRHs) in the case of Intra-Node B multi-flow. Therefore, in this aspect, link imbalances may occur between the cells, and independent repetition factors would be advantageous. However, repetition in some of the configurations in multi-flow may not be possible due to the format of the dedicated physical control channel for high speed downlink shared channel (HS-DPCCH) associated with that configuration.

In one aspect, communication manager 1002 or a radio network controller (RNC) in communication with communication manager 1002 may determine one or more CQI and/or HARQ-ACK repetition factors for the multi-flow communication of UE 1012 based at least in part on the determined CQI repetition rule or the HARQ-ACK repetition rule. In some aspects, the CQI and/or HARQ-ACK repetition factors may additionally or alternatively be based on other factors such as, for example, a CQI receiver strength of a Node B, a UE headroom limitation, or an uplink interference requirement of a Node B. In an exemplary aspect, when the configured CQI feedback cycle is greater than 2 ms, a Node B may have a tradeoff between low CQI repetition factor resulting in reduced uplink interference, and high CQI repetition factor resulting in improved CQI reception. For example, a Node B may use a low CQI repetition factor even in the face of weak CQI reception, so as to be able to maintain low uplink interference. In this case, a Node B may use a powerful CQI receiver to detect weak CQI even with low CQI repetition. In the above examples, the CQI feedback cycle is assumed to be the same and has a value greater than 2 ms.

Figure 2:
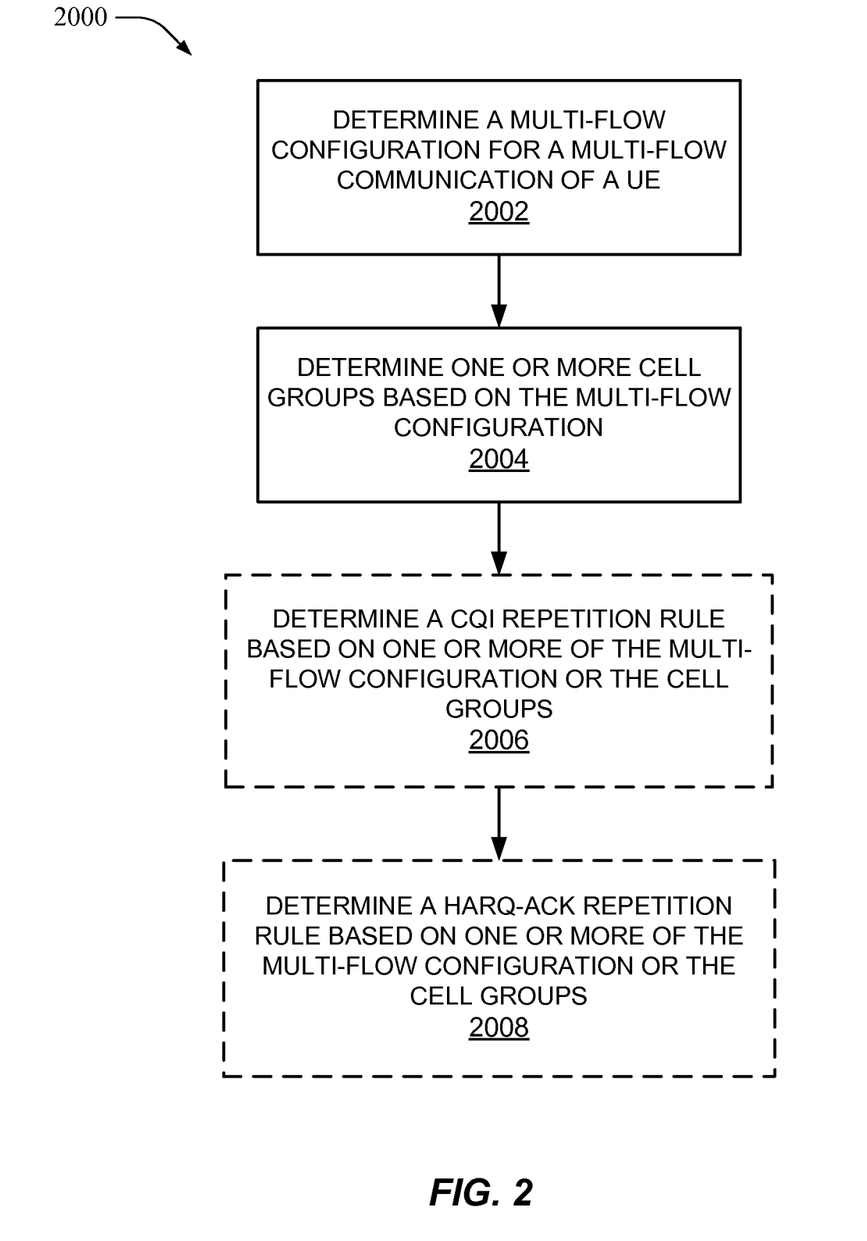
FIG. 2 is a flowchart of one aspect of a method of the system of FIG. 1.

Referring to FIG. 2, in one aspect, a method 2000 for improving performance in multi-flow communication is illustrated. For explanatory purposes, method 2000 will be discussed with reference to the above described FIG. 1. It should be understood that in other implementations, other systems and/or UEs, Node Bs, or communication managers comprising different components than those illustrated in FIG. 1 may be used in implementing method 2000 of FIG. 2.

At block 2002, communication manager 1002 determines a multi-flow configuration for a multi-flow communication of UE 1012. The multi-flow configuration may be, for example, an SF-DC non-MIMO configuration, an SF-DC MIMO configuration, a DF-3C non-MIMO configuration, a DF-3C MIMO configuration, a DF-4C non-MIMO configuration, or a DF-4C MIMO configuration. It should be understood that these configurations are non-limiting and are only exemplary, and that method 2000 may be used in other multi-flow configurations.

At block 2004, communication manager 1002 determines one or more cell groups by grouping the cells of the multi-flow configuration of UE 1012. In one aspect, for example, those cells of the multi-flow communication that are collocated are grouped together. In another aspect, for example, those cells of the multi-flow communication that share the same Node B are grouped together. In yet another aspect, for example, those cells of the multi-flow communication that have the same CQI timing are grouped together. In one aspect, a cell group consists of an assisted serving and an assisted secondary serving cell (or an assisting serving and an assisting secondary serving cell).

At optional blocks 2006 and 2008, in one aspect, communication manager 1002 may determine a CQI repetition rule or a HARQ-ACK repetition rule, respectively, for the multi-flow communication of UE 1012 based at least in part on the multi-flow configuration of UE 1012 or the determined cell groups. In some aspects, the CQI repetition rule or the HARQ-ACK repetition rule may allow the same CQI or HARQ-ACK repetition factor to be configured for the cells within each cell group. Further details of determining HARQ-ACK and CQI repetition rules based on different multi-flow configurations and/or cell groups are described according to exemplary aspects of the present disclosure as follows.

In one aspect of the present disclosure, the multi-flow configuration of the multi-flow communication of UE 1012 determines whether HARQ-ACK and CQI repetition is possible and whether the repetition parameters should be independent across the participating cells. In one aspect, repetition is configured to allow the CQI or HARQ-ACK feedback to be received even when the UE is headroom limited.

In one aspect, where the cells of a cell group in multi-flow operation belong to the same Node B, the link budget for those cells is the same. Therefore, there is no motivation to allow for different repetition factors between cells in such cell group. Accordingly, the same repetition factor may be applied to the HARQ-ACK and CQI feedbacks as in legacy multi-cell configurations.

In one aspect of the present disclosure, when HARQ-ACK and CQI repetition are feasible for a multi-flow configuration, a single repetition factor is used for HARQ-ACK and CQI repetition for cells within a cell group. In some aspects, the rules governing the configuration of repetition parameters are applied to both Intra-Node B and Inter-Node B multi-flow configurations, since allowing for different number of parameters for Intra-Node B and Inter-Node B multi-flow configurations may increase complexity and the number of configurations to test. Accordingly, in this aspect of the present disclosure, the rules for HARQ-ACK and CQI repetition are the same for both Intra-Node B and Inter-Node B multi-flow configurations.

In another aspect of the present disclosure, HARQ-ACK and CQI repetition rules are determined for an SF-DC multi-flow configuration when MIMO is not configured on any of the cells. According to this aspect, let the cells participating in SF-DC multi-flow operation be denoted as C1 and C2. The HS-DPCCH format for the SF-DC non-MIMO multi-flow configuration is shown in Table 1. The spreading factor used is SF256 with HS-DPCCH slot format #0.

TABLE 1

| HS-DPCCH format for SF-DC non-MIMO multi-flow | | | |
| --- | --- | --- | --- |
| ACK/NACK | CQI | ACK/NACK | CQI |
| C1, C2 | C1, C2 | C1, C2 | C1, C2 |

In this aspect, it is expected that the schedulers at the two Node Bs are independent, and each Node B is unaware of the scheduling patterns of the other Node B. Since the HARQ-ACK and CQI for the two cells are jointly encoded, and the scheduling patterns are independent, repeating the HARQ-ACK and CQI would not result in any soft-combining gain. The two codewords may be different even when one of the HARQ-ACK responses is the same. Therefore, in the absence of additional Node B RNC signaling, there would be no gain in allowing for HARQ-ACK repetition in the case of SF-DC non-MIMO multi-flow configuration. With respect to CQI reporting in this aspect, since the CQI is reported by the UE, it can be ensured that the same codeword can be re-transmitted with an increase in feedback cycle. However, it is essential that the repetition factor be the same for both of the configured cells. Independent CQI repetition factors would not be feasible in this aspect since that would lead to a mismatch in the CQI reporting, resulting in both Node Bs failing to decode some CQI reports. Therefore, while CQI repetition is possible in the case of SF-DC non-MIMO multi-flow operation, a single CQI repetition parameter that applies to both cells would need to be configured.

Accordingly, in one aspect of the present disclosure, in a SF-DC multi-flow configuration when MIMO is not configured on any of the cells, HARQ-ACK repetition is not feasible. Also, in this aspect, CQI repetition is possible but independent CQI repetition factors cannot be configured across the assisted and assisting serving cells.

In another aspect of the present disclosure, HARQ-ACK and CQI repetition factors are determined for an SF-DC multi-flow configuration when MIMO is configured on at least one of the cells. According to this aspect, let the cells participating in SF-DC multi-flow operation be denoted as C1 and C2. The HS-DPCCH format for the SF-DC MIMO multi-flow configuration is shown in Table 2. The spreading factor used is SF256 with HS-DPCCH slot format #0.

TABLE 2

| HS-DPCCH format for SF-DC MIMO multi-flow | | | |
| --- | --- | --- | --- |
| ACK/NACK | CQI | ACK/NACK | CQI |
| C1, C2 | C1 | C1, C2 | C2 |

As seen in Table 2, in this aspect, the CQI for the two cells is reported in consecutive transmission time interval (TTI) with a feedback cycle of 4 ms. The two TTIs where the CQIs are reported are considered to be a CQI reporting period. As in the SF-DC non-MIMO configuration, the HARQ-ACK feedback should not be repeated in this aspect since there would be no combining gain. On the other hand, since the CQI feedback pertaining to a particular cell is independently available, i.e., there is no joint coding of the CQI reports, it is possible to have independent repetition factors for CQI reporting. In summary, in this aspect, HARQ-ACK repetition is not feasible, but independent CQI repetition factors can be considered.

Accordingly, in one aspect of the present disclosure, in an SF-DC multi-flow configuration when MIMO is configured on at least one of the cells, HARQ-ACK repetition is not feasible but CQI repetition as well as the configuration of independent CQI repetition factors across the assisted and assisting serving cells is feasible.

In yet another aspect of the present disclosure, HARQ-ACK and CQI repetition factors are determined for a DF-3C multi-flow configuration where MIMO is not configured in any of the cells. According to this aspect, and without loss of generality, let the serving cell be denoted as C1 and let the assisting serving and assisting secondary serving cells be denoted as cells C2 and C3, respectively. The HS-DPCCH format for the DF-3C non-MIMO multi-flow configuration is shown in Table 3. The spreading factor used is SF256 with HS-DPCCH slot format #0.

TABLE 3

| HS-DPCCH format for DF-3C non-MIMO multi-flow | | | |
| --- | --- | --- | --- |
| ACK/NACK | CQI | ACK/NACK | CQI |
| C1, C2, C3 | C1 | C1, C2, C3 | C2, C2 |

In Table 3, it is seen that the HARQ-ACK is jointly encoded for all the three cells, while only the CQI for cells 2 and 3 are jointly encoded. Note that cells C2 and C3 are part of the same cell group and can be assumed to have a single repetition factor configured that applies to both of them. Since the scheduler for cell C1 is independent of the scheduler for cells C2 and C3, HARQ-ACK repetition is not feasible. However, the CQI report for cell C1 and the CQI report for cells C2 and C3 can be decoded independent of one another. Therefore, in this aspect, HARQ-ACK repetition is not feasible but CQI reports can have independent repetition factors.

Accordingly, in one aspect of the present disclosure, in a DF-3C multi-flow configuration where MIMO is not configured in any of the cells, HARQ-ACK repetition is not feasible but CQI repetition as well as the configuration of independent CQI repetition factors across different cell groups is feasible.

In a further aspect of the present disclosure, HARQ-ACK and CQI repetition factors are determined for a DF-3C configuration where MIMO is configured on at least one carrier. According to this aspect, let the serving cell be denoted as C1 and let the assisting serving and assisting secondary serving cells be denoted as cells C2 and C3, respectively. The HS-DPCCH format for DF-3C MIMO multi-flow configuration is shown in Table 4. The spreading factor used is SF128 with HS-DPCCH slot format #1.

TABLE 4

| HS-DPCCH format for DF-3C MIMO multi-flow | | | | | | | |
| --- | --- | --- | --- | --- | --- | --- | --- |
| A/N | A/N | CQI | CQI | A/N | A/N | CQI | CQI |
| C1 | C2, C3 | C1 | C1 | C1 | C2, C3 | C2 | C3 |

In this aspect, due to the grouping of the CQIs that has been agreed on in RAN1, the CQIs from the same Node B (CQIs C2 and C3) are grouped together and transmitted over one slot. The CQI for cell C1 is repeated and transmitted over two slots. In Table 4, it is seen that the HARQ-ACK as well as the CQI are self-contained in their respective time periods for each cell group. Therefore, in this aspect, it is possible for the HARQ-ACK feedback to be soft combined over two TTIs by only combining the associated symbols. Similarly, the CQI reports can be combined by only combining the relevant CQI symbols associated with a particular cell. Strictly speaking, it is not essential that the CQIs be the same for the cells in the cell groups, and hence it is possible to have independent repetition factors for the cells within a cell group. However, since there is no essential need for the cells to have different repetition factors, independent repetition factors are not considered to be advantageous. Nevertheless, in this aspect, it is feasible to allow for independent repetition factors for both HARQ-ACK and CQI reports.

Accordingly, in one aspect of the present disclosure, in a DF-3C configuration where MIMO is configured on at least one carrier, both HARQ-ACK and CQI repetition can be independently configured across cell groups.

In a further aspect of the present disclosure, HARQ-ACK and CQI repetition factors are determined for a DF-4C configuration. According to this aspect, let the assisted serving cell be denoted as C1, and let the assisted secondary serving cell be denoted as C2. Similarly, the assisting serving and assisting secondary serving cells are denoted as cells C3 and C4, respectively. The HS-DPCCH format for DF-4C configuration, where all four cells are active, is given in Table 5.

TABLE 5

| HS-DPCCH format for DF-4C multi-flow | | | | | | | |
| --- | --- | --- | --- | --- | --- | --- | --- |
| A/N | A/N | CQI | CQI | A/N | A/N | CQI | CQI |
| C1, C2 | C3, C4 | C1 | C2 | C1, C2 | C3, C4 | C3 | C4 |

Similar arguments as provided herein with reference to DF-3C with MIMO apply to this aspect as well. Since the cells within a cell group are grouped and transmitted together, the HARQ-ACK and CQI reports are well contained in their respective time periods. Therefore, in this aspect, there are no restrictions that apply to the HARQ-ACK and CQI repetitions, and it is feasible to have independent HARQ-ACK and CQI repetition factors for different cell groups.

Accordingly, in one aspect of the present disclosure, in a DF-4C configuration, both HARQ-ACK and CQI repetition can be independently configured across cell groups.

Different aspects of the present disclosure describe whether HARQ-ACK and CQI repetition factors could be configured independently between cell groups. In one aspect of the present disclosure, the same rules apply when one or more cells in a particular configuration have been deleted. Since the other Node Bs would be unaware of the deactivation, the HARQ-ACK and CQI reporting formats are such that the decoding is independent of such activation/deactivation events.

Figure 3:
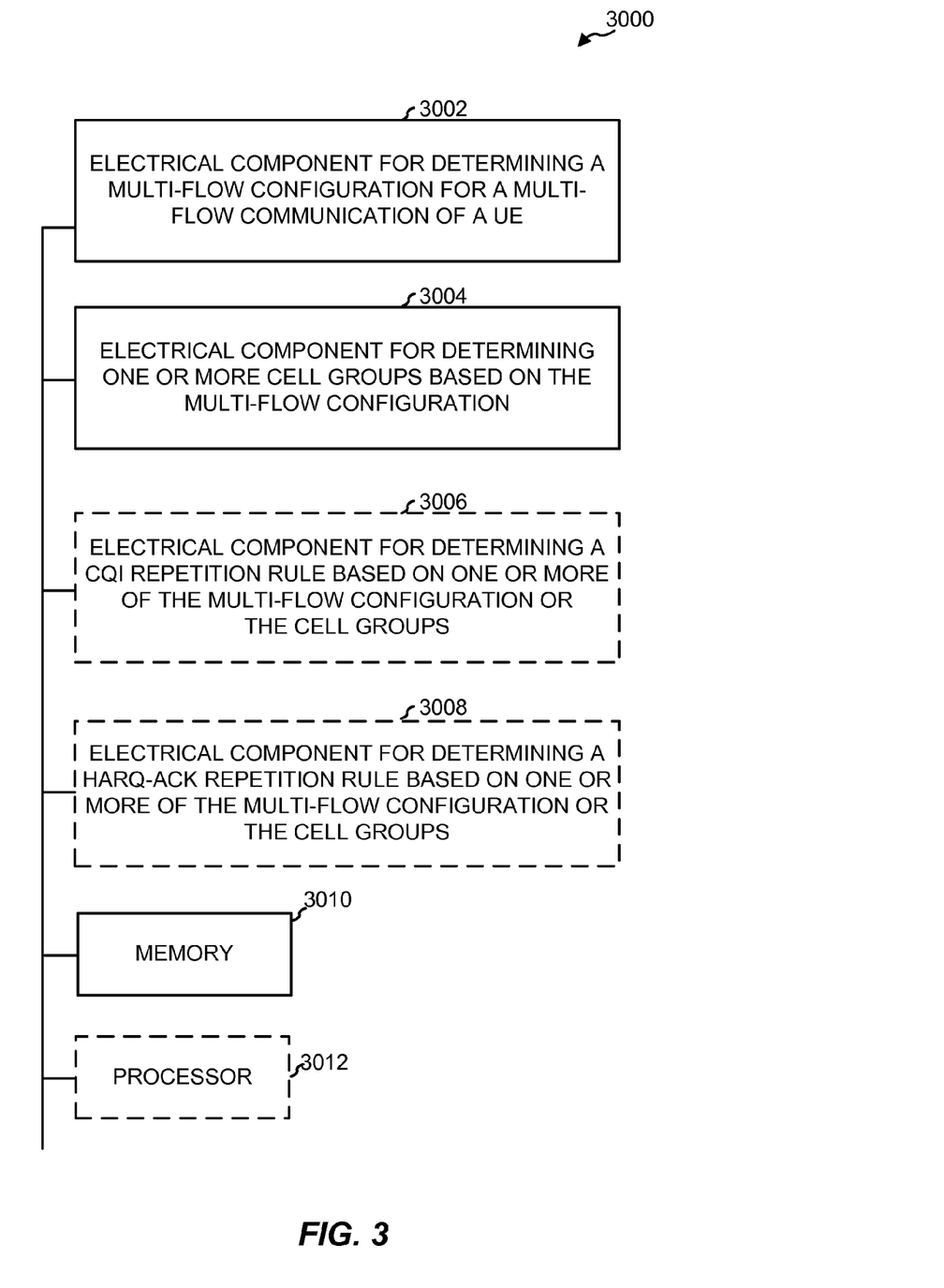
FIG. 3 is a block diagram illustrating an example of a hardware implementation for an apparatus of FIG. 1 employing a processing system.

FIG. 3 is a block diagram illustrating an example of a hardware implementation for communication manager 1002 of FIG. 1. FIG. 3 shows apparatus 3000 that includes memory 3010 and may include processor 3012. Processor 3012 is responsible for general processing, including the execution of software stored on the memory 3010. In some aspects, the software, when executed by processor 3012, may cause apparatus 3000 to perform the various functions described herein with references to various components of apparatus 3000.

Apparatus 3000 includes electrical component 3002 for determining a multi-flow configuration for a multi-flow communication of UE 1012. The multi-flow configuration may be, for example, an SF-DC non-MIMO configuration, an SF-DC MIMO configuration, a DF-3C non-MIMO configuration, a DF-3C MIMO configuration, a DF-4C non-MIMO configuration, or a DF-4C MIMO configuration. It should be understood that these configurations are non-limiting and only exemplary, and that apparatus 3000 may be used in other multi-flow configurations.

Apparatus 3000 also includes electrical component 3004 for determining one or more cell groups by grouping the cells of the multi-flow configuration of UE 1012. In one aspect, for example, those cells of the multi-flow communication that are collocated are grouped together. In another aspect, for example, those cells of the multi-flow communication that share the same Node B are grouped together. In yet another aspect, for example, those cells of the multi-flow communication that have the same CQI timing are grouped together. In one aspect, a cell group consists of an assisted serving and an assisted secondary serving cell (or an assisting serving and an assisting secondary serving cell).

Apparatus 3000 may include electrical components 3006 and 3008, for determining a CQI repetition rule or a HARQ-ACK repetition rule, respectively, for the multi-flow communication of UE 1012 based at least in part on the multi-flow configuration of UE 1012 or the determined cell groups. In some aspects, the CQI repetition rule or the HARQ-ACK repetition rule may allow the same CQI or HARQ-ACK repetition factor to be used for the cells within each cell group.

Figure 4:
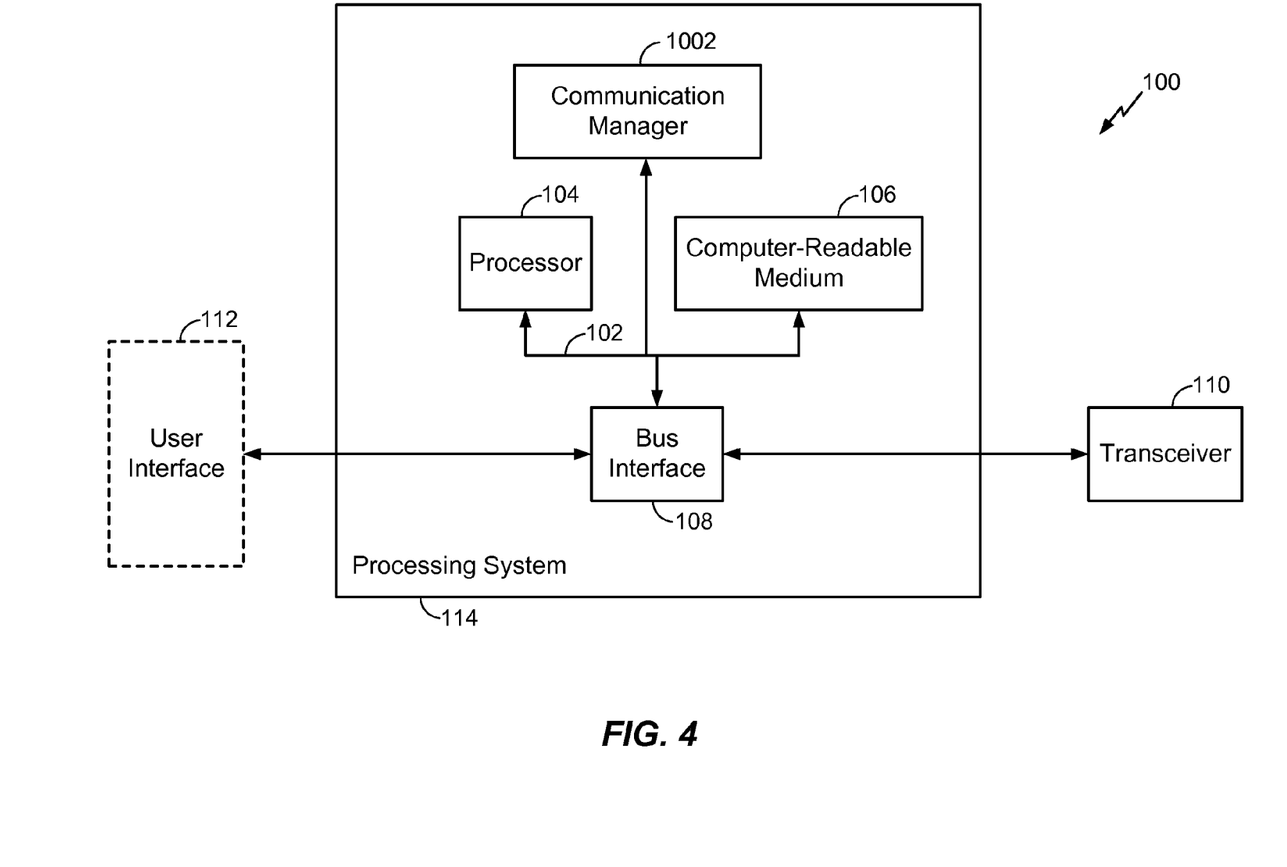
FIG. 4 is a block diagram illustrating another example of a hardware implementation for an apparatus of FIG. 1 employing a processing system.

FIG. 4 is a conceptual diagram illustrating an example of a hardware implementation for an apparatus 100 employing a processing system 114 to operate, for example, UE 1012, Node Bs 1014, 1016, communication manager 1002, or apparatus 3000 (see FIGS. 1 and 3), and/or respective components thereof. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided. Apparatus 100 also includes communication manager 1002 (see FIG. 1) that is linked to other components of apparatus 100 by bus 102.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 5:
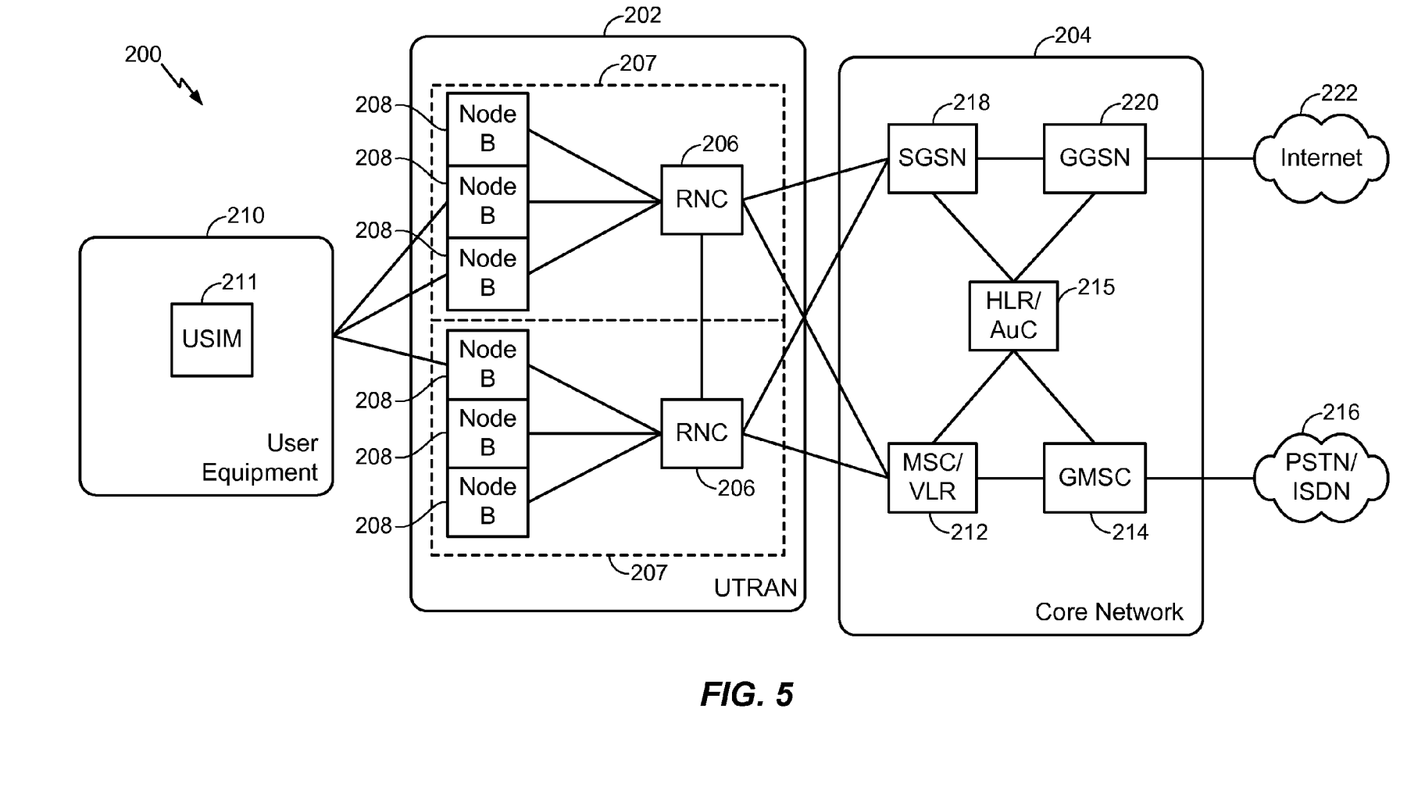
FIG. 5 is a block diagram conceptually illustrating an example of a telecommunications system including aspects of the system of FIG. 1.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In FIG. 5, UE 210, Node Bs 208, and UTRAN 202 may include, for example, UE 1012, Node Bs 1014, 1016, communication manager 1002, apparatus 3000, or apparatus 100 (see FIGS. 1, 3, and 4). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 6:
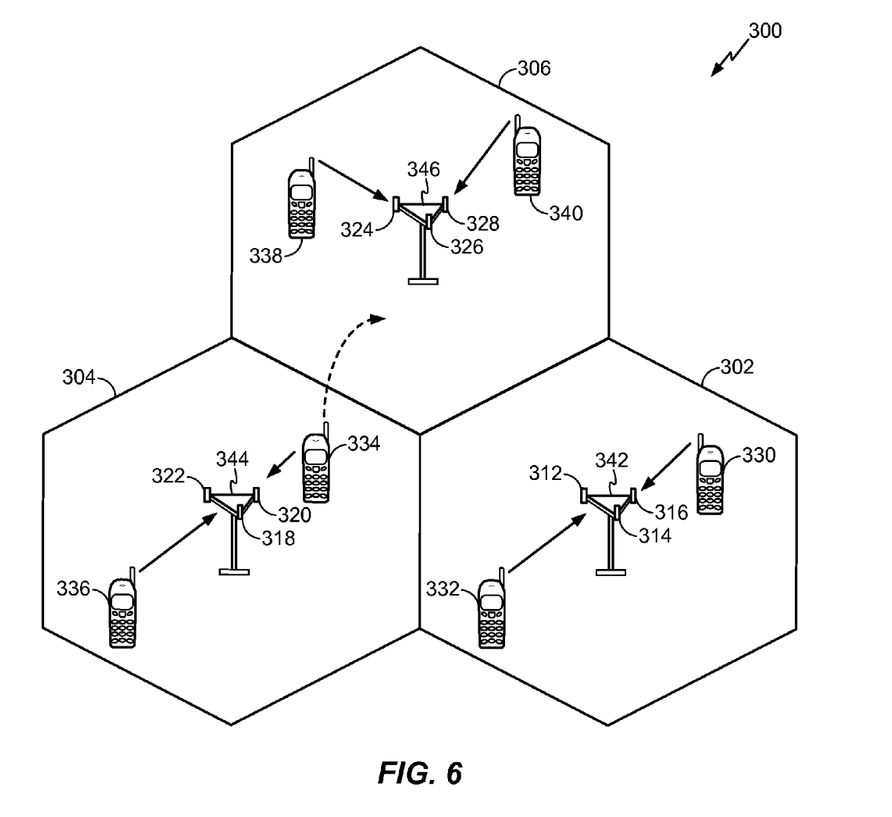
FIG. 6 is a conceptual diagram illustrating an example of an access network including aspects of the system of FIG. 1.

Referring to FIG. 6, an access network 300 in a UTRAN architecture is illustrated that includes UEs 330, 332, 334, 336, 338, 340, and Node Bs 342, 344, 346 which may include UE 1012, Node Bs 1014, 1016, communication manager 1002, apparatus 3000, or apparatus 100 (see FIGS. 1, 3, and 4). The multiple access wireless communication system includes multiple cellular regions (cells), including cells 302, 304, and 306, each of which may include one or more sectors. Cells 302, 304, and 306 may be, for example, cells 1030, 1032, 1034, and 1036 (see FIG. 1). The multiple sectors can be formed by groups of antennas with each antenna responsible for communication with UEs in a portion of the cell. For example, in cell 302, antenna groups 312, 314, and 316 may each correspond to a different sector, and may be antenna groups 1018, 1020, 1022, or antenna groups 1024, 1026, and 1028 (see FIG. 1). In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 5) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 5), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
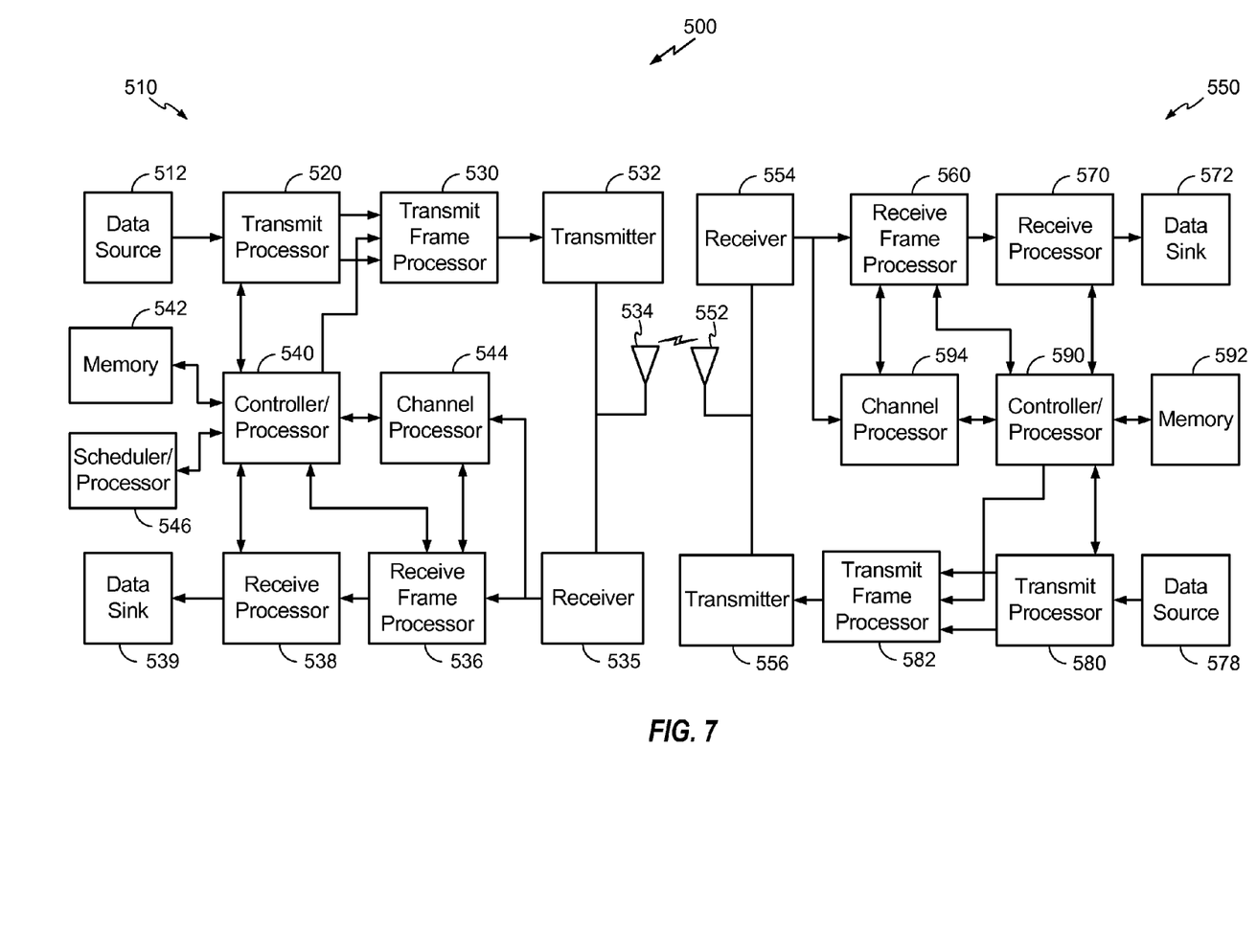
FIG. 7 is a block diagram conceptually illustrating an example of a Node B in communication with a UE in a telecommunications system, including aspects of the system of FIG. 1.

FIG. 7 is a block diagram of a Node B 510 in communication with a UE 550, where Node B 510 and UE 550 may be or may at least partially include UE 1012, Node Bs 1014, 1016, communication manager 1002, apparatus 100, or apparatus 3000 (see FIGS. 1, 3, and 4). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
    determining a multi-flow configuration for a multi-flow communication of a user equipment (UE), wherein the multi-flow configuration identifies
        whether a multi-frequency configuration is utilized, and
        whether multiple-input multiple-output (MIMO) communication is configured for at least one cell in the multi-flow communication;
    determining one or more cell groups based on the multi-flow configuration; and
    determining at least one of a channel quality indicator (CQI) repetition rule or a hybrid automatic repeat request acknowledgment (HARQ-ACK) repetition rule for the multi-flow communication based on one or more of the multi-flow configuration or the one or more cell groups, wherein the CQI repetition rule allows an independent CQI repetition factor to be configured for each cell group that comprises a plurality of cells that share a Node B.

2. The method of claim 1, wherein each cell group of the one or more cell groups comprises one or more cells that share a Node B.

3. The method of claim 1, wherein the HARQ-ACK repetition rule allows for an independent HARQ-ACK repetition factor to be configured for each cell group that comprises a plurality of cells whose HARQ-ACKs are jointly scheduled.

4. The method of claim 1, wherein the CQI repetition rule allows for a single CQI repetition factor to be configured for all cells of the one or more cell groups, when the multi-flow configuration is a single-frequency dual-cell (SF-DC) configuration and MIMO communication is not configured.

5. The method of claim 1, wherein the CQI repetition rule allows for an independent CQI repetition factor to be configured for each cell of the one or more cell groups, when the multi-flow configuration is a single-frequency dual-cell (SF-DC) configuration and MIMO communication is configured.

6. The method of claim 1, wherein the CQI repetition rule allows for an independent CQI repetition factor to be configured for each cell group that comprises a plurality of cells that share a Node B, when the multi-flow configuration is a dual-frequency three-cell (DF-3C) configuration and MIMO communication is not configured.

7. The method of claim 1, wherein the CQI repetition rule allows for an independent CQI repetition factor for each cell group that comprises a plurality of cells who share a Node B, when the multi-flow configuration is a dual-frequency three-cell (DF-3C) configuration and MIMO communication is configured.

8. The method of claim 1, wherein the CQI repetition rule allows for an independent HARQ-ACK repetition factor for each cell group that comprises a plurality of cells whose HARQ-ACKs are jointly scheduled, when the multi-flow configuration is a dual-frequency three-cell (DF-3C) configuration and MIMO communication is configured.

9. The method of claim 1, wherein the CQI repetition rule allows for an independent CQI repetition factor for each cell of the one or more cell groups, when the multi-flow configuration is a dual-frequency four-cell (DF-4C) configuration.

10. The method of claim 1, wherein the CQI repetition rule allows for an independent HARQ-ACK repetition factor for each cell group that comprises a plurality of cells whose HARQ-ACKs are jointly scheduled, when the multi-flow configuration is a dual-frequency four-cell (DF-4C) configuration.

11. A non-transitory computer-readable medium storing executable code for wireless communication, comprising:
code for determining a multi-flow configuration for a multi-flow communication of a user equipment (UE), wherein the multi-flow configuration identifies whether a multi-frequency configuration is utilized, and whether multiple-input multiple-output (MIMO) communication is configured for at least one cell in the multi-flow communication;
code for determining one or more cell groups based on the multi-flow configuration; and
code for determining at least one of a channel quality indicator (CQI) repetition rule or a hybrid automatic repeat request acknowledgment (HARQ-ACK) repetition rule for the multi-flow communication based on one or more of the multi-flow configuration or the one or more cell groups, wherein the CQI repetition rule allows an independent CQI repetition factor to be configured for each cell group that comprises a plurality of cells that share a Node B.

12. An apparatus comprising:
means for determining a multi-flow configuration for a multi-flow communication of a user equipment (UE), wherein the multi-flow configuration identifies whether a multi-frequency configuration is utilized, and whether multiple-input multiple-output (MIMO) communication is configured for at least one cell in the multi-flow communication;
means for determining one or more cell groups based on the multi-flow configuration; and
means for determining at least one of a channel quality indicator (CQI) repetition rule or a hybrid automatic repeat request acknowledgment (HARQ-ACK) repetition rule for the multi-flow communication based on one or more of the multi-flow configuration or the one or more cell groups, wherein the CQI repetition rule allows an independent CQI repetition factor to be configured for each cell group that comprises a plurality of cells that share a Node B.

13. An apparatus comprising:
at least one processor; and
a memory coupled to the at least one processor;
wherein the at least one processor is configured to:
determine a multi-flow configuration for a multi-flow communication of a user equipment (UE), wherein the multi-flow configuration identifies
whether a multi-frequency configuration is utilized, and
whether multiple-input multiple-output (MIMO) communication is configured for at least one cell in the multi-flow communication;
determine one or more cell groups based on the multi-flow configuration; and
determine at least one of a channel quality indicator (CQI) repetition rule or a hybrid automatic repeat request acknowledgment (HARQ-ACK) repetition rule for the multi-flow communication based on one or more of the multi-flow configuration or the one or more cell groups, wherein the CQI repetition rule allows an independent CQI repetition factor to be configured for each cell group that comprises a plurality of cells that share a Node B.

14. The apparatus of claim 13, wherein. each cell group of the one or more cell groups comprises one or more cells that share a Node B.

15. The apparatus of claim 13, wherein the HARQ-ACK repetition rule allows for an independent HARQ-ACK repetition factor to be configured for each cell group that comprises a plurality of cells whose HARQ-ACKs are jointly scheduled.

16. The apparatus of claim 13, wherein the CQI repetition rule allows for a single CQI repetition factor to be configured for all cells of the one or more cell groups, when the multi-flow configuration is a single-frequency dual-cell (SF-DC) configuration and MIMO communication is not configured.

17. The apparatus of claim 13, wherein the CQI repetition rule allows for an independent CQI repetition factor to be configured for each cell of the one or more cell groups, when the multi-flow configuration is a single-frequency dual-cell (SF-DC) configuration and MIMO communication is configured.

18. The apparatus of claim 13, wherein the CQI repetition rule allows for an independent CQI repetition factor to be configured for each cell group that comprises a plurality of cells that share a Node B, when the multi-flow configuration is a dual-frequency three-cell (DF-3C) configuration and MIMO communication is not configured.

19. The apparatus of claim 13, wherein the CQI repetition rule allows for an independent CQI repetition factor for each cell group that comprises a plurality of cells who share a Node B, when the multi-flow configuration is a dual-frequency three-cell (DF-3C) configuration and MIMO communication is configured.

20. The apparatus of claim 13, wherein the CQI repetition rule allows for an independent HARQ-ACK repetition factor for each cell group that comprises a plurality of cells whose HARQ-ACKs are jointly scheduled, when the multi-flow configuration is a dual-frequency three-cell (DF-3C) configuration and MIMO communication is configured.

21. The apparatus of claim 13, wherein the CQI repetition rule allows for an independent CQI repetition factor for each cell of the one or more cell groups, when the multi-flow configuration is a dual-frequency four-cell (DF-4C) configuration.

22. The apparatus of claim 13, wherein the CQI repetition rule allows for an independent HARQ-ACK repetition factor for each cell group that comprises a plurality of cells whose HARQ-ACKs are jointly scheduled, when the multi-flow configuration is a dual-frequency four-cell (DF-4C) configuration.

\* \* \* \* \*